(12) United States Patent
Cassis et al.

(10) Patent No.: US 12,508,768 B2
(45) Date of Patent: Dec. 30, 2025

(54) POLYMERIC MATERIAL EXTRUSION NOZZLE AND PRINT HEAD FOR ADDITIVE MANUFACTURING COMPRISING SUCH EXTRUSION NOZZLE

(71) Applicant: CARACOL S.R.L., Lomazzo (IT)

(72) Inventors: Paolo Cassis, Lomazzo (IT); Daniele Vanerio, Lomazzo (IT); Giovanni Avallone, Lomazzo (IT)

(73) Assignee: CARACOL S.R.L., Lomazzo (IT)

( * ) Notice: Subject to any disclaimer, the term of this patent is extended or adjusted under 35 U.S.C. 154(b) by 92 days.

(21) Appl. No.: 17/882,751

(22) Filed: Aug. 8, 2022

(65) Prior Publication Data

US 2023/0356464 A1 Nov. 9, 2023

(30) Foreign Application Priority Data

May 6, 2022 (IT) .................. 102022000009392

(51) Int. Cl.
*B29C 64/209* (2017.01)
*B33Y 30/00* (2015.01)

(52) U.S. Cl.
CPC ............ *B29C 64/209* (2017.08); *B33Y 30/00* (2014.12)

(58) Field of Classification Search
CPC .............................. B29C 64/209; B29C 64/00
See application file for complete search history.

(56) References Cited

U.S. PATENT DOCUMENTS

| | | | |
|---|---|---|---|
| 2019/0001579 A1* | 1/2019 | Wang | B29C 64/232 |
| 2019/0061248 A1* | 2/2019 | Saito | B29C 64/245 |
| 2020/0016832 A1* | 1/2020 | Yuwaki | B29C 64/106 |
| 2021/0086443 A1 | 3/2021 | Cote et al. | |
| 2021/0129227 A1 | 5/2021 | Carrier et al. | |
| 2022/0324168 A1* | 10/2022 | Taylor | B33Y 30/00 |
| 2022/0339874 A1* | 10/2022 | Stranberg | B29C 64/165 |

FOREIGN PATENT DOCUMENTS

| | | | |
|---|---|---|---|
| CN | 113427759 | * | 9/2021 |
| CN | 113844029 A | * | 12/2021 |
| CN | 216182815 | | 4/2022 |
| EP | 3395537 | | 10/2018 |
| WO | 2015107333 | | 7/2015 |
| WO | 2019141606 | | 7/2019 |

OTHER PUBLICATIONS

CN 113844029 A EPO translation with annotations of Paragraph numbers (Year: 2021).*
Yan et al. CN113427759A (Year: 2021).*
Search Report and Written Opinion dated Dec. 13, 2022, in connection with Italian Application No. 10202200009392 (9 pages).

* cited by examiner

*Primary Examiner* — Susan D Leong
(74) *Attorney, Agent, or Firm* — KLINTWORTH & ROZENBLAT LLP

(57) ABSTRACT

An extrusion nozzle of a print head for additive manufacturing, the extrusion nozzle extending about a longitudinal axis and having an insert provided with a through opening and an outer ring; and a connecting member configured to partially accommodate the insert and to define a stop element for the outer ring of the insert and provided with a hole through which the insert protrudes, and a coupling member configured to tighten the outer ring of the insert, the connecting member and a plasticizing cylinder by means of a releasable junction system.

9 Claims, 1 Drawing Sheet

POLYMERIC MATERIAL EXTRUSION NOZZLE AND PRINT HEAD FOR ADDITIVE MANUFACTURING COMPRISING SUCH EXTRUSION NOZZLE

CROSS-REFERENCE TO RELATED APPLICATIONS

This patent application claims priority from Italian patent application no. 102022000009392 filed on May 6, 2022, the entire disclosure of which is incorporated herein by reference.

FIELD OF THE ART

The present invention concerns an extrusion nozzle of a print head for additive manufacturing or three-dimensional printing of polymers, technopolymers and composite materials.

Additive manufacturing is used to make products and semi-finished products, even large-sized ones, which require lightness, strength and have complex geometries such as, for example, bodies and frames in the nautical, aeronautical and automotive industries, machinery components and architectural structures.

STATE OF THE ART

Three-dimensional printing involves manufacturing articles through an additive manufacturing process starting from a file of a digital three-dimensional model, made by means of a CAD modelling system.

The present invention refers, in particular, to three-dimensional printing with Fused Deposition Model (FDM or Fused Filament Fabrication—FFF) technology, which is based on the use of a print head provided with an extruder having a plasticizing cylinder and an extrusion nozzle, from which a fused polymeric material exits. The fused polymeric material exiting the extrusion nozzle is deposited in layers on a work surface, according to a predefined three-dimensional model. Once deposited by the extruder, the layer of polymeric material solidifies immediately and bonds to an adjacent layer of material. The succession of superimposed layers thus forms a single solid structure or final article of desired shape.

The extrusion nozzle with circular section causes the formation of porosity in the section of the products and the reduction of the contact surface between successive layers. Porosity leads to a reduction in the mechanical properties of the components made with this technology.

To overcome this drawback, the Applicant has devised an extruder provided with a nozzle with a polygonal section, in particular rectangular, and in which the extruder can be selectively oriented so that the layers can be arranged to increase the adhesion surface between the layers reducing the gaps as shown in patent application IT102018000010225 belonging to the Applicant.

A print head generally comprises heating members associated with the plasticizing cylinder for heating the plasticizing cylinder, an extrusion screw for advancing and melting the polymeric material in the plasticizing cylinder and ejecting the fused polymeric material through the extrusion nozzle.

Generally, the polymeric material is fed to the print head in the granular or flake state or in the form of pellets through a feeding device which comprises at least one hopper and a conduit connecting the hopper to the print head.

In many additive manufacturing processes, and particularly in the case of the FGF (Fused Granulate Fabrication) process, it is necessary to replace the extrusion nozzle in order to change the dimensions and/or shape of the nozzle opening. The shape and the dimensions of the outlet opening play a key role on both the polymer plasticization process and on the characteristics of the final component.

In addition, the nozzles must be periodically replaced due to wear and tear, which is particularly pronounced in the case of extrusion of fibre-reinforced polymers.

Replacing the nozzle is an operation not without its drawbacks and risks damaging both the extrusion nozzle and the plasticizing cylinder.

OBJECT OF THE INVENTION

Aim of the present invention is to make an extrusion nozzle that is free from the drawbacks of the prior art.

In accordance with the present invention an extrusion nozzle for a print head for additive manufacturing is realised, the extrusion nozzle extending about a longitudinal axis and comprising:
  an insert provided with a through opening for depositing polymeric material in a pasty state and an outer ring;
  a connecting member configured to partially accommodate the insert and to define a stop element for the outer ring of the insert and provided with a hole, through which the insert protrudes, and a coupling member configured to tighten the outer ring of the insert between the connecting member and a plasticizing cylinder by means of a junction system.

This makes it possible to replace only the insert, which has no threads and is held in place thanks to the outer ring that guarantees the placement thereof and allows locking by means of a tightening action.

The connecting member comprises a cup-shaped body, which has an annular recess (configured to fittably accommodate the outer ring of the insert and define a stop element for the outer ring of the insert.

This solution increases the accuracy in centring and locking the insert.

The extrusion nozzle comprises a funnel-shaped body housed, in part, in the cup-shaped body and configured to be clamped between the plasticizing cylinder and the connecting member.

In particular, the function of the funnel-shaped body is to guide the plasticized polymer and make the passage from the cross-section of the plasticizing cylinder to the cross-section of the insert opening smooth. Furthermore, the funnel-shaped body can be replaced independently of the other components of the extrusion nozzle.

The funnel-shaped body is arranged to rest on the outer ring of the insert.

In this way, the clamping between the connecting member and the plasticizing cylinder locks both the insert and the funnel-shaped body in place.

In particular, the insert has an inlet port and an outlet port, the inlet port being delimited by a first flared face, said funnel-shaped body being provided with a second flared face flush with the first flared face, in particular the first and the second flared faces have the same inclination.

In this way, turbulences in the flow of the plasticized material are avoided.

In particular, the funnel-shaped body and the connecting member are conformed to realize an axially symmetry shape coupling for the benefit of the axial centring of the funnel-shaped body.

In accordance with an embodiment of the present invention, the extrusion nozzle comprises a perforated disc clamped between the funnel-shaped body and the plasticizing cylinder.

The perforated disc has the function of filtering the plastic material before extrusion. Thanks to the present invention, the perforated disc is replaceable independently of the other components of the nozzle and is locked in place together with the insert and the funnel-shaped body.

In particular, the funnel-shaped body comprises an annular recess, within which the outer edge of the perforated disc is partially accommodated in order to realize the centring of the perforated disc.

The present invention also relates to a print head that is free from the drawbacks of the prior art.

In accordance with the present invention, a print head for additive manufacturing is realized, the print head comprising:
- a plasticizing cylinder;
- an extrusion nozzle made in accordance with one or more of the characteristics identified above; and
- a releasable junction system for connecting the plasticizing cylinder and the extrusion nozzle.

In particular, the plasticizing cylinder comprises an end coupling member configured to be facing and contact said coupling member; the end coupling member and the coupling member are joined by means of said releasable type junction system.

In particular, the plasticizing cylinder has an annular end recess for accommodating, in part, the extrusion nozzle so as to ensure the centring of the nozzle with respect to the plasticization cylinder.

DESCRIPTION OF THE DRAWINGS

Further characteristics and advantages of the present invention will become clear from the following description of non-limiting examples of embodiment thereof, with reference to the figures of the attached drawings, in which.

PREFERRED EMBODIMENT OF THE INVENTION

Figure 1:
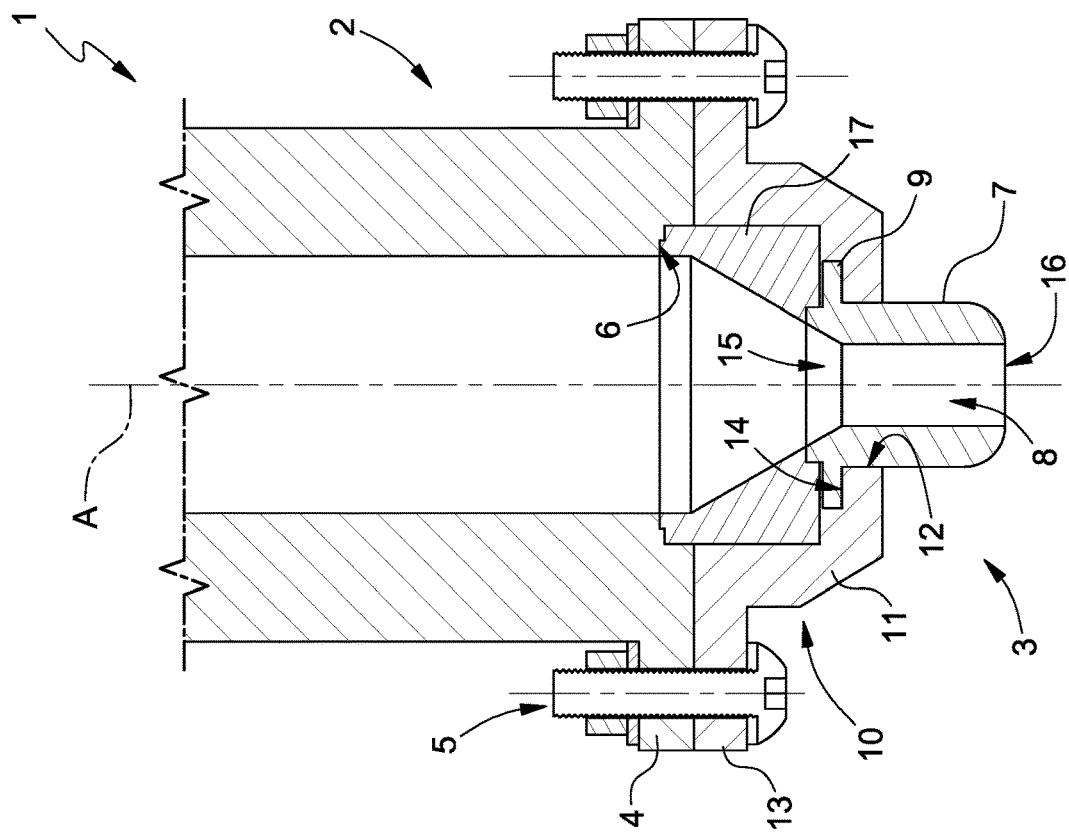
FIG. 1 is a sectional view, with parts removed for clarity's sake and parts indicated schematically, of a print head for additive manufacturing in accordance with the present invention.

In FIG. 1, reference number 1 denotes a print head for additive manufacturing. The print head 1 extends along a longitudinal axis 1 and comprises a plasticizing cylinder 2, and an extrusion nozzle 3.

The plasticizing cylinder 2 comprises an end coupling member 4, in the case shown a perforated flange, configured to be connected to the extrusion nozzle 3 by means of a releasable type junction system 5 which, in the case shown, is a bolted joint; and an end annular recess 6 for accommodating, in part, the extrusion nozzle 3.

The extrusion nozzle 3 comprises an insert 7 provided with a through opening 8 and an outer ring 9; a coupling member 10 comprising a cup-shaped body 11 configured to partially accommodate the insert 7 and to define a stop shoulder for the insert 7; a central hole 12 to allow the insert 7 to protrude outwardly; and a coupling member 13, which extends about the cup-shaped body 11 and is configured to tighten the ring 9 of the insert 7 between the cup-shaped body 11 and the plasticizing cylinder 2 by means of the junction system 5. In the case shown, the coupling member 13 is defined by a perforated flange and the junction system 5 is defined by a bolted joint.

The cup-shaped body 11 has an annular recess 14 configured to accommodate the outer ring 9. In essence, the housing has a height slightly lower than the thickness of the outer ring 9.

The through opening 8 of the insert has an inlet port 15 and an outlet port 16, through which, in use, the polymeric material in a pasty state exits.

The extrusion nozzle 3 comprises a funnel-shaped body 17 housed, in part, in the cup-shaped body 11 and configured to be clamped between the plasticizing cylinder 2 and the connecting member 10. The funnel-shaped body 17 is arranged to rest on the outer ring 9 of the insert 7. The inlet port 15 and the funnel-shaped body 17 are delimited by respective flared faces which, in the case shown, have the same inclination.

The funnel-shaped body 17 and the connecting member 10 are conformed to realize an axially symmetrical shape coupling.

The extrusion nozzle 3 comprises a perforated disc 18 clamped between the funnel-shaped body 17 and the plasticizing cylinder 2.

The funnel-shaped body 17 comprises an annular recess 19, within which the outer edge of the perforated disc 18 is partially housed.

In the case shown, the opening 9 is substantially a hole delimited by a cylindrical wall with a given diameter with the exception of the inlet port 15 delimited by a flared face. The nozzle 3 comprises a plurality of inserts, not shown in the accompanying Figures, having the same shape and dimensional characteristics as the opening and inserts having openings with different shapes and dimensions. All the inserts have identical characteristics in shape and dimensions of the outer part that makes them interchangeable with each other.

The inserts can be replaced because they are worn out or because of operating requirements that require a change in the shape and/or dimension of the opening.

Similarly, the funnel-shaped body 17 and the perforated disc 18 can be replaced if required.

Figure 2:
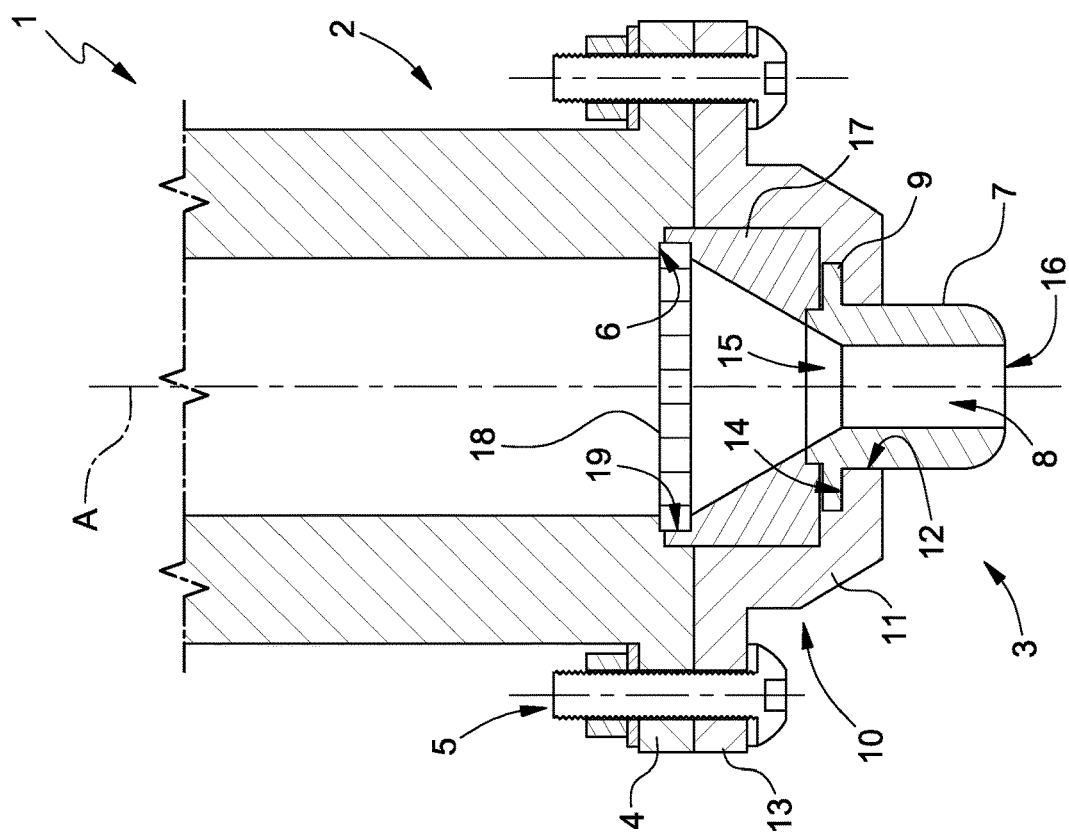
FIG. 2 is a schematic elevation view, with parts removed for clarity's sake and on an enlarged scale, of a variant of the print head in FIG. 1.

With reference to FIG. 2, the perforated disc 18 is omitted, and the face of the funnel-shaped body 17 is connected to the inner face of the plasticizing cylinder 2 instead of having the annular recess 19.

Finally, it is apparent that the present invention comprises further variants of the disclosed embodiments included in the scope of protection of the appended claims.

The invention claimed is:

1. An extrusion nozzle for a print head for additive manufacturing, the extrusion nozzle extending about a longitudinal axis and comprising:
   - an unthreaded insert provided with a through opening for the passage of polymeric material in a pasty state and an outer ring; and
   - a connecting member configured to partially accommodate the insert and to define a stop element for the outer ring of the insert and provided with a hole, through which the insert protrudes, and a coupling member configured to tighten the outer ring of the insert between the connecting member and a plasticizing cylinder by means of a junction system,
   wherein the connecting member comprises a cup-shaped body, wherein the cup-shaped body has an annular recess configured to fittably accommodate the outer ring of the insert and define the stop element for the outer ring of the insert; and a further body having a funnel-shaped channel extending therethrough wherein the further body is housed, in part, in the cup-shaped body and clamped between and in contact with the plasticizing cylinder and the connecting member wherein the funnel-shaped channel tapers from a first end having a first cross-sectional size and disposed proximate the plasticizing cylinder and a second end opposite the first end and abutting the insert and having a second cross-sectional size smaller than the first cross-sectional size;

wherein the through opening of the insert has a first insert end having a third cross-sectional size substantially equal to the second cross-sectional size and a second insert end opposite the first insert end and having a fourth cross-sectional size less than the third cross-sectional size.

2. The extrusion nozzle as claimed in claim 1, wherein the further body is arranged to rest on the outer ring of the insert.

3. The extrusion nozzle as claimed in claim 1, wherein the insert has an inlet port and an outlet port, the inlet port being delimited by a first flared face, said funnel-shaped body being provided with a second flared face flush with the first flared face, the first and the second flared faces having the same inclination.

4. The extrusion nozzle as claimed in claim 1, wherein said further body and said connecting member are conformed to realize an axially symmetrical shape coupling.

5. The extrusion nozzle as claimed in claim 1, and comprising a perforated disc clamped between the further body and the plasticizing cylinder.

6. The extrusion nozzle as claimed in claim 5, wherein the further body comprises an annular recess, within which the outer edge of the perforated disc is partially housed.

7. The extrusion nozzle as claimed in claim 1, wherein the junction system releasably connects the plasticizing cylinder to the extrusion nozzle.

8. The extrusion nozzle as claimed in claim 7, wherein the plasticizing cylinder comprises an end coupling member configured to be facing and contacting said coupling member; the end coupling member and the coupling member being joined by the junction system.

9. The extrusion nozzle as claimed in claim 7, wherein the plasticizing cylinder has an annular end recess for accommodating, in part, the extrusion nozzle.

* * * * *